United States Patent [19]

Oldenburg et al.

[11] 4,049,032

[45] Sept. 20, 1977

[54] CHAIN DELIMBER ASSEMBLY FOR TREE HARVESTER

[75] Inventors: Dorrance Oldenburg, Yorkville; Robert L. Fischer, New Lenox, both of Ill.

[73] Assignee: Caterpillar Tractor Co., Peoria, Ill.

[21] Appl. No.: 644,234

[22] Filed: Dec. 24, 1975

[51] Int. Cl.² ............................................. A01G 23/08
[52] U.S. Cl. ............................ 144/2 Z; 144/309 AC; 144/3 D
[58] Field of Search .................... 144/2 Z, 3 D, 34 R, 144/34 E, 309 AC

[56] References Cited
U.S. PATENT DOCUMENTS

| 3,682,210 | 8/1972 | Landers et al. | 144/2 Z |
| 3,842,872 | 10/1972 | Moser et al. | 144/2 Z X |
| 3,881,532 | 5/1975 | Jouppi | 144/2 Z |

FOREIGN PATENT DOCUMENTS 243,182  9/1969  U.S.S.R. ............................ 144/2 Z

Primary Examiner—Othell M. Simpson
Assistant Examiner—W. D. Bray
Attorney, Agent, or Firm—Wegner, Stellman, McCord, Wiles & Wood

[57] ABSTRACT

A delimber assembly suitable for use in a tree harvesting machine wherein the delimber assembly has a flexible blade structure for removing limbs from a tree, springs connected to oppositely disposed end portions of the blade for urging the end portions outwardly from the machine, and a movable support member for movably mounting an intermediate portion of the blade means so that the intermediate portion is permitted to float along the tree surface to accommodate crooked trees. A stop is preferably included to limit movement of the support member and thus the blade.

6 Claims, 5 Drawing Figures

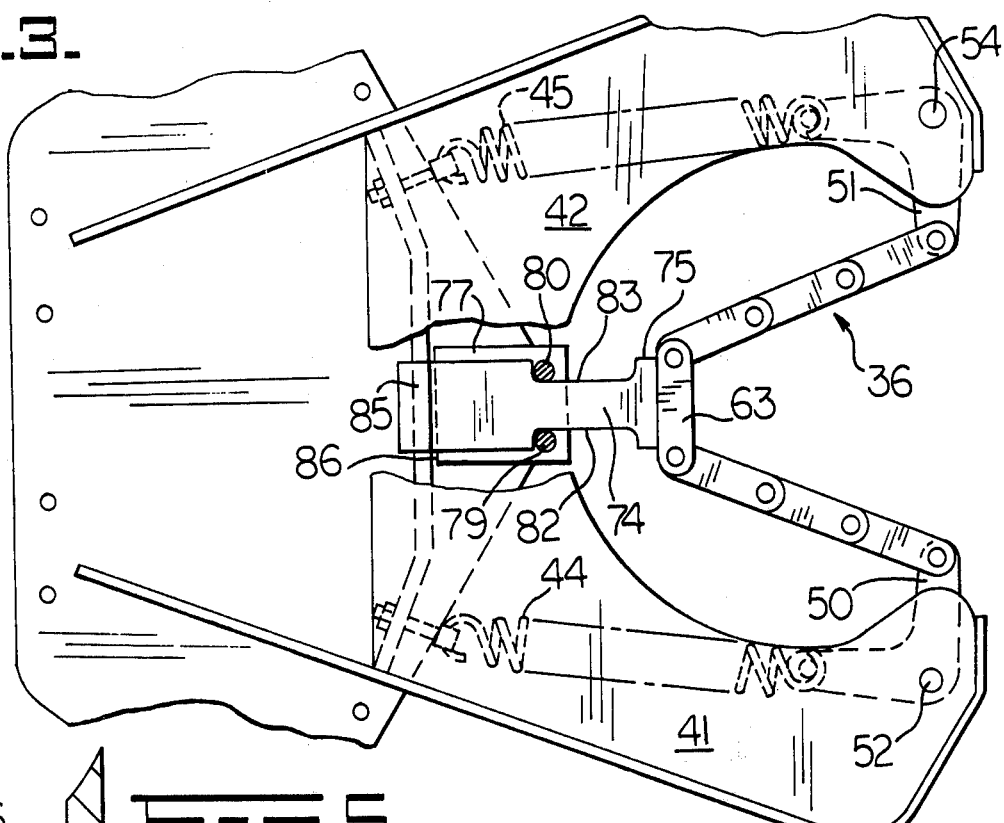
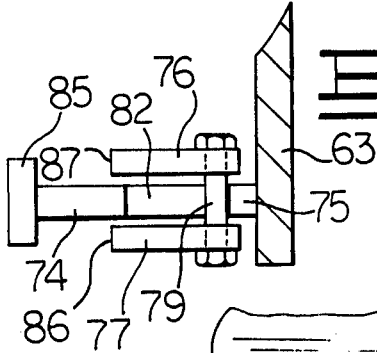
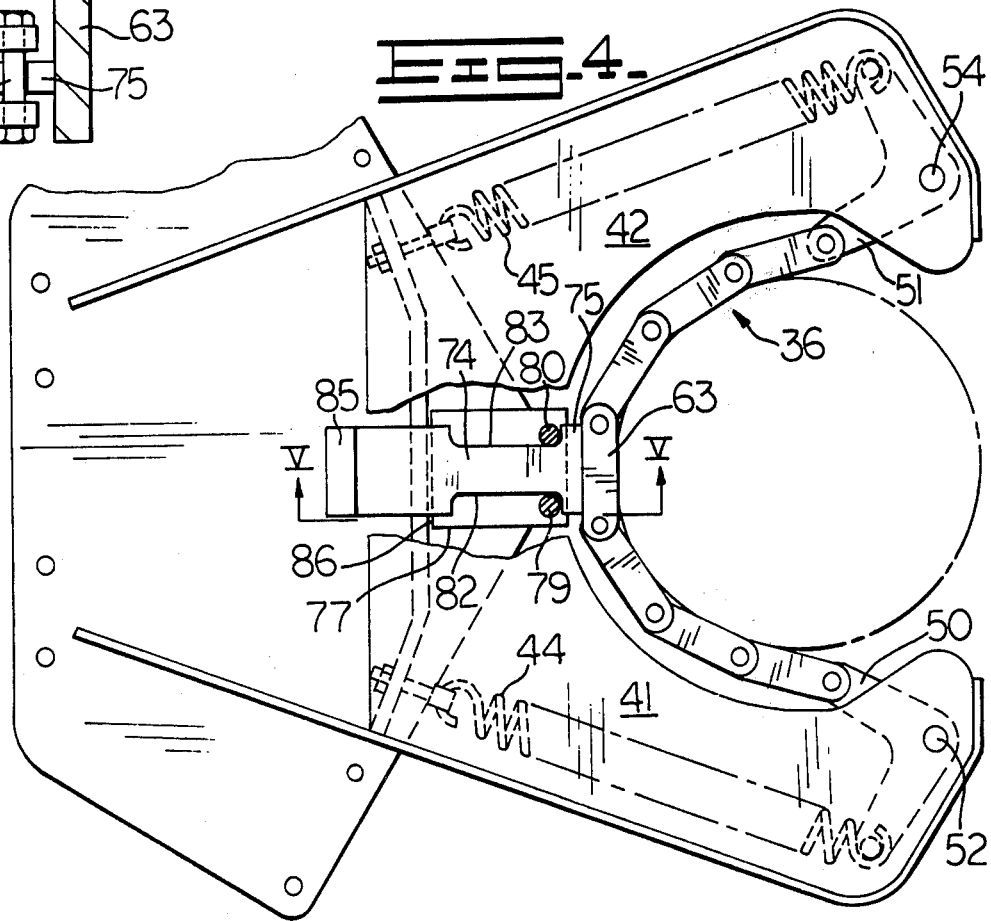

CHAIN DELIMBER ASSEMBLY FOR TREE HARVESTER

BACKGROUND OF THE INVENTION

The present invention relates to a new and improved tree harvesting machine attachable to a vehicle, and more particularly, to an improved partial chain delimber in such a tree harvesting machine.

The present invention concerns a tree harvesting machine with a delimber assembly as generally shown and described in Moser et al. U.S. Pat. No. 3,842,872 entitled "Delimber Assembly for Tree Harvesting Machines", issued Oct. 22, 1974. Other tree processing units of the tree harvesting machine to which the present invention has particular application are more completely described in Moser et al. U.S. Pat. No. 3,731,720 entitled "Shear Assembly for Tree Harvesters", issued May 8, 1973, and Gutman et al. U.S. Pat. No. 3,669,161 entitled "Drive Mechanism for Tree Harvesters", issued June 13, 1972. All of the above are assigned to the assignee of the present invention.

A tree is rarely, if ever, perfectly formed. The trunk of a tree is usually bent, crooked, curved or misshapen.

The prior art tree harvesting machines mentioned above are very effective in cutting and delimbing most trees. However, a tree which is curved or misshapen does present additional difficulties during the tree harvesting process, particularly when the tree is being delimbed. It is highly desirable for efficient tree harvesting that limbs and other protrusions be removed as completely as possible from trees to provide logs which can be easily handled during further processing. The flexible blade delimber of the harvesting machine shown in U.S. Pat. No. 3,842,872 provided accommodation for the changing size of a tree and to some extent its shape, but badly misshapen trees induced the failure of the flexible blade delimber to sever limbs as near the tree trunk surface as possible, especially in instances where the tree was bent, curved, or partially concave such that the delimber blade could not follow such bends or curves.

SUMMARY OF THE INVENTION

It is, therefore, the principal object of the present invention to provide an improved delimber assembly for use with a tree harvesting machine. More specifically, it is an object of the present invention to provide a partial chain delimber which has the capability of effectively accommodating bent, crooked or irregularly-formed tree trunks.

In accordance with the present invention, a delimber assembly has a flexible blade coupled at both ends to a harvester head frame through a pair of tension springs and having an intermediate portion movably secured to the harvester head frame so that the intermediate portion is movable outward from the frame so as to float along the trunk surface of the tree and conform thereto so that limbs are cut off nearer the surface of the tree than was previously possible.

In an exemplary embodiment of the present invention, the delimber blade is comprised of pivotally joined links, an intermediate link, normally the central link, of which is mounted on a movable mechanism carried by the harvester head frame.

In one embodiment, the movable mechanism includes a lever centrally pivoted to the harvester head frame and having one end secured to the central link of the delimber blade and one end engageable with a stop member which limits outward movement of the intermediate portion of the blade. In an alternative embodiment, the movable mechanism includes a link slidably received between two guide plates and having one end secured to the central link of the delimber blade. The link is provided with a stop mechanism to limit movement of the intermediate portion of the blade.

An additional feature of the present invention is the pivotal mounting of the central link to the movable member which thereby permits the central link of the delimber blade to orient itself tangentially against the circumferential surface of the tree trunk as the tree is driven through the harvester.

Further features and advantages of the invention will readily be apparent from the following specification taken in conjunction with the accompanying drawings.

BRIEF DESCRIPTION OF THE DRAWINGS

FIG. 3 is a view of an alternative embodiment of the present invention showing a small tree placed within the delimber assembly;

FIG. 4 is a view of the embodiment illustred in FIG. 3 showing a larger tree placed within the delimber assembly; and FIG. 5 is a side elevational view taken along line 5—5 of FIG. 4.

DESCRIPTION OF THE PREFERRED EMBODIMENT

Figure 1:
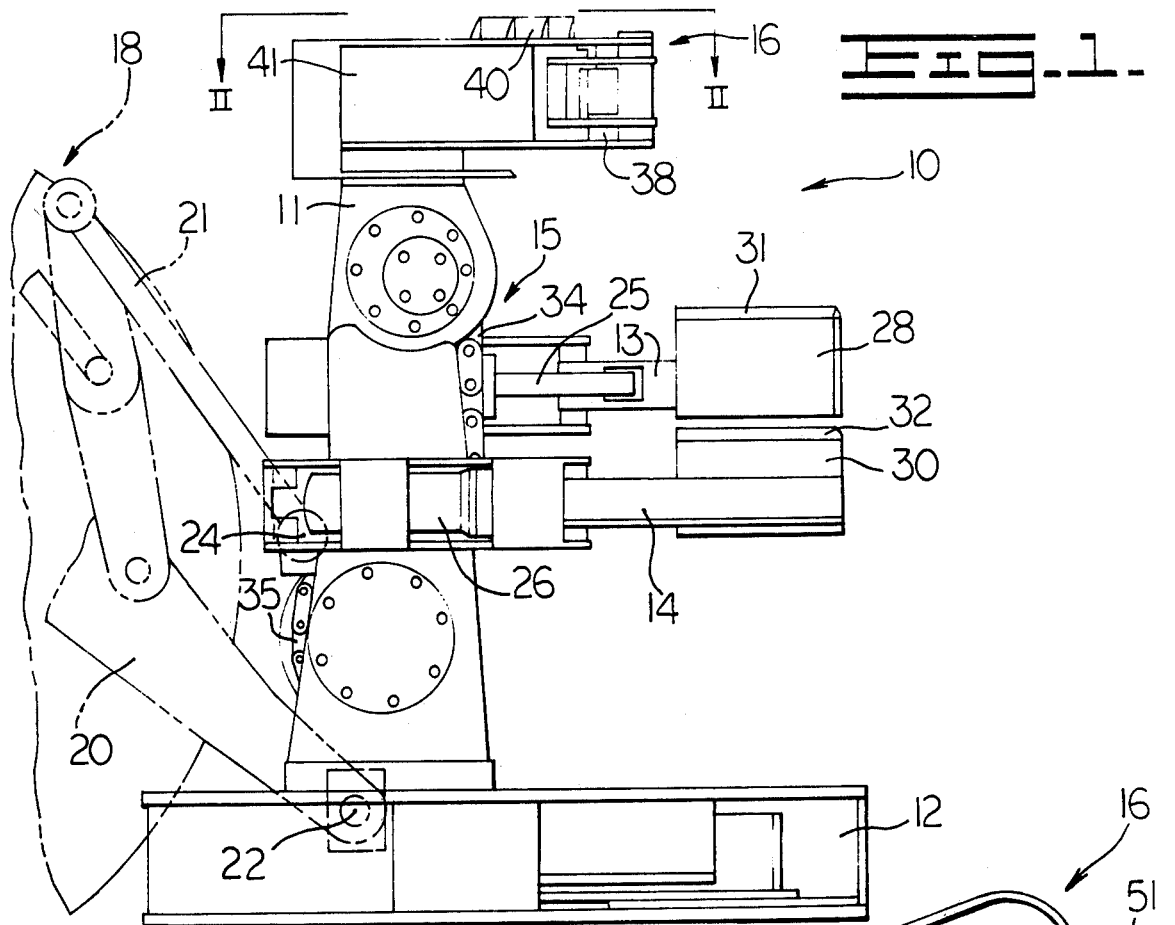
FIG. 1 is a side elevational view of a tree processing machine employing the present invention and illustrating a fragmentary portion of a vehicle on which a harvester head is mounted.

Referring to FIG. 1, a tree harvesting machine constructed according to the present invention includes a harvester head or attachment 10 having an elongate frame 11 along which a shear assembly 12, a pair of grapple arms 13 and 14, a drive mechanism, generally designated 15, and a delimber assembly 16 are arranged.

The harvester head frame 11 is movably mounted on a vehicle 18 (partially shown). The vehicle 18 is a generally conventional loader vehicle of the type commonly adapted for use with a loader bucket and having a pair of lift arms, one of which is designated 20, and a tilt linkage 21. The harvester head frame 11 is interconnected with the lift arms 20 and the tilt linkage 21 by pivot connections indicated at 22 and 24, respectively.

The shear assembly 12 is mounted upon the lower end of the harvester head frame 11 and includes means for cutting trees placed within the harvester head 10 and severing them from the ground. A double acting hydraulic jack (not shown) is operable in extension for closing the shear assembly 12 in cutting through the trunk of a tree placed in the harvester head 10. Retraction of the jack serves to reopen the shear assembly 12. Additional details of the shear assembly of the type utilized herein may be found in U.S. Pat. No. 3,731,720 cited earlier.

The grapple arms 13 and 14 are pivotally supported upon the harvester head frame 11 and operable by double acting hydraulic jacks 25 and 26, respectively, for urging a tree into engagement with the drive mechanism 15. At the end of each of grapple arms 13 and 14 are arcuate impact shearing blades 28 and 30, respectively, having respective cutting edges 31 and 32 extending generally away from the direction of tree movement produced by the drive mechanism 15 to cut off limbs generally facing away from the harvester head frame 11. Each of the jacks 25 and 26 are interconnected between the harvester head frame 11 and its respective grapple arm. The jacks 25 and 26 are operable in extension for closing the grapple arms 13 and 14 against a tree and for urging them into engagement with the drive mechanism 15. The jacks 25 and 26 are retractable for opening the grapple arms 13 and 14 and releasing the tree from the harvester head 10. The jacks 25 and 26 tend to act resiliently upon the grapple arms 13 and 14 during the processing operation so that the grapple arm blades 28 and 30 are constantly urged into engagement with the tree and so that the tree is also urged into engagement with the delimber assembly 16 and with the drive mechanism 15. To prevent interference between the grapple arm blades 28 and 30 and the delimber assembly 16, the grapple arms 13 and 14 are axially offset along the harvester head frame 11 relative to the delimber assembly 16 and to each other.

The drive mechanism 15 is arranged on a midportion of the harvester head frame 11. Generally, the drive mechanism 15 is formed with an endless track or chain assembly 34 arranged for rotation upon harvester head frame 11 by means of rollers and sprockets, one of which is designated 35. A hydraulic rotary drive motor (not shown) is coupled with one of the sprockets for operating the drive mechanism 15. Additional details of the drive mechanism may be found in U.S. Pat. No. 3,669,161 noted above.

The delimber assembly 16 constructed according to the present invention is mounted upon the upper end of the harvester head frame 11. The delimber assembly 16 includes a flexible blade, generally designated 36, composed of pivotally interconnected chain links 38 having impact cutting edges 40 extending generally away from the direction of tree movement produced by the drive mechanism 15 for delimbing a tree. The flexible blade 36 is supported at each end by brackets 41 and 42 on the harvester head frame 11. When a tree is positioned between the brackets 41 and 42, the blade 36 partially encircles the tree and is urged into engagement against the surface of the tree by tension springs 44 and 45 acting on the ends of the blade 36 so that the impact cutting edged thereon cut those limbs generally facing toward the harvester head frame 11. The flexible blade 36 has an intermediate portion supported by the harvester head frame 11 so that the blade is neither pulled straight between the brackets 41 and 42 by the springs 44 and 45 nor pulled downwardly toward the drive mechanism 15 by the tree as it moves through the harvester head 10.

The ends 46 and 48 of the brackets 41 and 42 are bifurcated and receive bell cranks 50 and 51, respectively. Pins 52 and 54 pivotally mount the bell cranks 50 and 51 in place. The blade 36 has its ends 55 and 56 pivotally connected to ends 58 and 60, respectively, of the bell cranks 50 and 51, respectively. The opposite ends 61 and 62 of the bell cranks 50 and 51 are coupled to respective ones of the tension springs 44 and 45, which are also coupled to the frame 11 through the anchor 61. Hence, the springs 44 and 45 tend to cause the levers 55 and 56 to rotate and urge the free ends 55 and 56 of the flexible blade 36 outwardly and away from the harvester head frame 11 and to tension the flexible blade 36 between the brackets 41 and 42. The flexible blade 36 is thusly concave toward the harvester head frame 11.

In accordance with the present invention, a mechanism is provided for movably supporting an intermediate portion of the flexible blade 36. In one embodiment shown in FIG. 2, an intermediate link, normally, the central chain link 63, has an inwardly projecting arm segment 64 pivotally secured at 65 to a supporting lever 66 which is pivotally mounted on the harvester head frame 11 by a pivot pin 68. The flexible blade 36 thereby has its intermediate portion supported for limited movement toward and away from the harvester head frame 11. The lever 66 is pivoted for rotation about an axis substantially parallel to the path of the tree through the delimber assembly. The segment 64 is also pivotally rotatable about an axis substantially parallel to the path of the tree through the delimber assembly. Thus, the central chain link 63 is pivotally supported so that its orientation relative to the harvester head frame 11 may change so that the central link 63 will tangentially float along the circumferential surface of the tree trunk. As a result, the ability of the blade 36 to conform to a tree is maximized.

Figure 2:
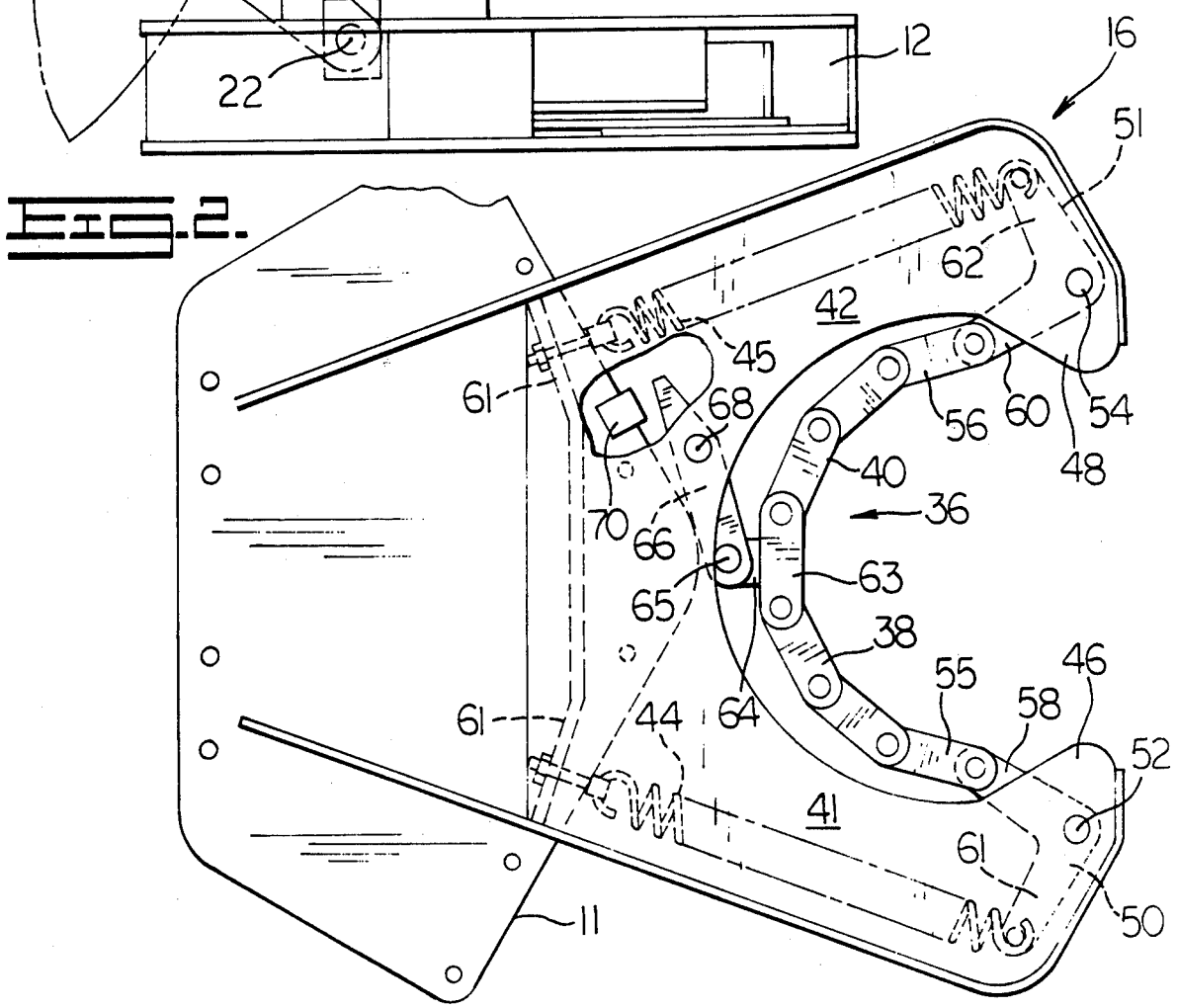
FIG. 2 is a view taken along line 2—2 of FIG. 1 illustrating one embodiment of the present invention.

To limit rotation of the lever 66 and, therefore, outward movement of the central chain link 63, a stop 70 is provided as an abutment for contacting the lever 66, as seen through the cutaway portion in FIG. 2. The stop 70 prevents the flexible blade 36 from being pulled straight between the bell cranks 50 and 51 and, thereby, maintains the concave posture of the flexible blade 36 so that the blade 36 continues to partially encircle the tree.

To initiate the delimbing process, the harvester head is rotated forwardly and downwardly by the tilt linkage 21 so that the tree is in a generally horizontal position. The tree is urged axially within the harvester head 10 toward and through shear assembly 12 by the rotating chain assembly 34 of the drive mechanism 15. When the tree is advanced through the harvester head 10, limbs and other projections are removed by the delimbing assembly 16 in conjunction with the grapple arm blades 28 and 30 as the limbs and projections impact the respective cutting edges. During this phase of operation, the grapple arm blades 28 and 30 continue to be urged by the grapple arm jacks 25 and 26 into processing engagement with the circumference of the tree and the grapple arms 13 and 14 continue to urge the tree into proper engagement with the drive mechanism 15 and the flexible blade 36 of the delimber assembly 16. The action of the springs 44 and 45 urges the flexible blade 36 to partially encircle the tree and biases the central link 63 outward into contact with the tree trunk regardless of the curve or bend at any point along its length. When the trunk curves toward the harvester head frame 11, the central chain link 63 moves inwardly but remains in contact with the trunk so that limbs are sheared near the trunk. As the trunk bends outwardly, the central chain link 63 is permitted to move outwardly to engage the tree.

An alternative embodiment, shown in FIGS. 3 through 5, inlcudes a link 74 which has an end 75 connected to the central chain link 63. The connection may provide pivotal movement between the link 74 and the chain link 63, as described above. The link 74 is movable between an extended position shown in FIG. 3 and a retracted position shown in FIG. 4. To this end, the link 74 is slidably received between two guide plates 76 and 77 which are carried by the brackets 41 and 42. A pair of guiding shoulder bolts or pins 79 and 80 are carried by and extend between the guide plates 76 and 77 and through the elongate channels 82 and 83 formed in the sides of the link 74. The bolts 79 and 80 act as stops to provide abutments for the ends of the channels 82 and 83 so as to define the limits of inward and outward movement of the link 74.

An additional stop means or enlarged portion 85 is provided on the inner end of the link 74 remote from the flexible blade 36 and the guide plates 76 and 77 to abut the ends 86 and 87 of the guide plates 76 and 77 and limit outward movement. It will be appreciated, however, that only one stop mechanism need be employed in an operative embodiment.

We claim:

1. In a delimber assembly suitable for use with a tree harvesting machine including elongate, flexible blade means for cutting limbs from a tree, means connected between the machine and the oppositely disposed end portions of the blade means for urging the end portions outwardly from the machine, means on the machine for urging the tree against the blade means, and means on the machine for moving a tree through the delimber assembly along a predetermined path, the improvement comprising:

a lever pivotally mounted on the assembly for rotation about an axis generally parallel to said path, a portion of said lever being operatively connected to a portion of the blade means intermediate the oppositely disposed end portions for movably supporting said intermediate portion, said lever being pivotally mounted on the assembly with said lever portion generally parallel to a line tangent to said intermediate portion of the blade means and with said lever portion moving when said lever pivots generally outwardly from and inwardly toward said machine along a line perpendicular to said tangent line and passing outwardly between the end portions of said blade means whereby said lever permits relative motion between the machine and said intermediate portion so that said intermediate portion of the blade means floats along the tree surface with the blade means at least partially encircling and engaging the tree to cut off the limbs of the tree near the surface of the tree as the tree moves through the delimber assembly.

2. In a delimber assembly suitable for use with a tree harvesting machine including elongate, flexible blade means for cutting limbs from a tree, means connected between the machine and the oppositely disposed end portions of the blade means for urging the end portions outwardly from the machine, means on the machine for urging the tree against the blade means, and means on the machine for moving a tree through the delimber assembly, the improvement comprising:

a lever pivotally mounted on the assembly, said lever being operatively connected to a portion of the blade means intermediate the oppositely disposed end portions for movably supporting said intermediate portion, said lever permitting relative motion between the machine and said intermediate portion whereby said intermediate portion of the blade means is permitted to float along the tree surface, and the blade means at least partially encircles and engages the tree so that the limbs of the tree are cut off near the surface of the tree by the blade means as the tree moves through the delimber assembly; and
stop means carried by said assembly adjacent said lever to provide an abutment for said lever whereby said lever pivots only a predetermined amount so that said intermediate portion is movable outwardly until said lever abuts said stop means.

3. The delimber assembly of claim 2 wherein said intermediate portion is connected to one end portion of said lever.

4. The delimber assembly of claim 3 wherein said stop means is located adjacent the end portion opposite of said one end portion of said lever and said lever is pivotally mounted between said lever end portions.

5. In a delimber assembly suitable for use with a tree harvesting machine including elongate, flexible blade means for cutting limbs from a tree, means connected to oppositely disposed end portions of the blade means for urging the end portions outwardly from the machine, means on the machine for urging the tree against the blade means, and means on the machine for moving a tree through the delimber assembly, the improvement comprising:

a lever pivotally mounted on the assembly, said lever being operatively connected to a portion of the blade means intermediate the oppositely disposed end portions for movably supporting said intermediate portion, said lever permitting relative motion between the machine and said intermediate portion whereby said intermediate portion of the blade means is permitted to float along the tree surface, and the blade means at least partially encircles and engages the tree so that the limbs of the tree are cut off near the surface of the tree by the blade means as the tree moves through the delimber assembly; and
an inwardly projecting arm carried by the blade means intermediate said oppositely disposed end portions, said arm being connected to said lever whereby the blade means is movably supported by said lever so that said intermediate portion is movable through the pivotal action of said lever inwardly toward and outwardly from the machine.

6. In a delimber assembly suitable for use with a tree harvesting machine including elongage, flexible blade means for cutting limbs from a tree, means connected between the machine and the oppositely disposed end portions of the blade means for urging the end portions outwardly from the machine, means on the machine for urging the tree against the blade means, and means on the machine for moving a tree through the delimber assembly, the improvement comprising:

A pair of spaced plates carried by the assembly;
a link slidably received between and guided by said plates along a predesignated path, said link operatively connected to a portion of the blade means intermediate the oppositely disposed end portions for movably supporting said intermediate portion, said link movable inwardly toward and outwardly from the machine to permit relative motion between the machine and said intermediate portion, said link having means defining a channel having spaced ends; and
a bolt member carried by said plates, said bolt member engaging said means defining the channel for relative movement between the ends of said channel to define the limits of inward and outward movement of said link, whereby said intermediate portion of the blade means is permitted to float along the tree surface and the blade means at least partially encircles and engages the tree so that the limbs of the tree are cut off near the surface of the tree by the blade means as the tree moves through the delimber assembly.

* * * * *

UNITED STATES PATENT AND TRADEMARK OFFICE
CERTIFICATE OF CORRECTION

PATENT NO. : 4,049,032
DATED : September 20, 1977
INVENTOR(S) : Dorrance Oldenburg and Robert L. Fischer It is certified that error appears in the above-identified patent and that said Letters Patent are hereby corrected as shown below:

Column 6, line 38, "elongage" should read --elongate--.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*